US011067980B2

(12) United States Patent
Ho et al.

(10) Patent No.: US 11,067,980 B2
(45) Date of Patent: Jul. 20, 2021

(54) GROUND STATION FOR AN UNMANNED AERIAL VEHICLE (UAV)

(71) Applicant: XDynamics Limited, Hong Kong (HK)

(72) Inventors: Sai Hung Ho, Kowloon (HK); Man Wah Chan, Mid-Levels (HK)

(73) Assignee: XDYNAMICS LIMITED, Hong Kong (HK)

(*) Notice: Subject to any disclaimer, the term of this patent is extended or adjusted under 35 U.S.C. 154(b) by 222 days.

(21) Appl. No.: 16/326,288

(22) PCT Filed: Oct. 18, 2016

(86) PCT No.: PCT/CN2016/102363
§ 371 (c)(1),
(2) Date: Feb. 18, 2019

(87) PCT Pub. No.: WO2018/072082
PCT Pub. Date: Apr. 26, 2018

(65) Prior Publication Data
US 2019/0235491 A1    Aug. 1, 2019

(51) Int. Cl.
*G05F 1/00* (2006.01)
*B64C 39/02* (2006.01)
(Continued)

(52) U.S. Cl.
CPC ......... *G05D 1/0033* (2013.01); *B64C 39/024* (2013.01); *G05B 19/042* (2013.01);
(Continued)

(58) Field of Classification Search
CPC .. G05D 1/0033; G05D 1/0016; G05D 1/0038; G05D 1/0044; B64C 2201/127
See application file for complete search history.

(56) References Cited

U.S. PATENT DOCUMENTS 10,452,064 B1 * 10/2019 Ray .................. B64C 39/024
2013/0259469 A1 * 10/2013 Smith ................. H04J 14/0282
398/16
(Continued)

FOREIGN PATENT DOCUMENTS

CN       102591346 A    7/2012
CN       104991478 A    10/2015
(Continued)

OTHER PUBLICATIONS

W. Zhang (Ed.): Software Engineering and Knowledge Engineering, AISC 162, pp. 249-256. 2012 (Year: 2012).*
(Continued)

*Primary Examiner* — Peter D Nolan
*Assistant Examiner* — Mikko Okechukwu Obioha (57) ABSTRACT

The invention relates to a ground station for a UAV comprising a housing for accommodating a system on chip (SOC) circuit including a control processor for executing software to wirelessly control functions of the UAV, a first screen, and a second screen, wherein one or both screens are controlled directly by the SOC control processor. The housing may comprise a clam shell housing comprising a first housing member for accommodating the control processor and a second housing member movable relative to the first housing member between a first closed position overlaying said first housing member and a second open position. The arrangement is such that the first housing member has mounted thereon the first screen and the second housing member has mounted thereon the second screen such that both screens are viewable by a user when the second housing member is in its open position.

14 Claims, 3 Drawing Sheets

(51) Int. Cl.
*G05B 19/042* (2006.01)
*G05D 1/00* (2006.01)

(52) U.S. Cl.
CPC ......... *G05D 1/0016* (2013.01); *G05D 1/0038* (2013.01); *G05D 1/0044* (2013.01); *B64C 2201/127* (2013.01); *B64C 2201/146* (2013.01)

(56) References Cited

U.S. PATENT DOCUMENTS

| | | | | |
|---|---|---|---|---|
| 2016/0117853 | A1* | 4/2016 | Zhong | G01C 21/00 345/634 |
| 2017/0300051 | A1* | 10/2017 | Zhou | B64C 25/32 |
| 2017/0351900 | A1* | 12/2017 | Lee | B64C 39/024 |

FOREIGN PATENT DOCUMENTS

| | | |
|---|---|---|
| CN | 2014790576 U | 11/2015 |
| CN | 204989832 U | 1/2016 |
| CN | 105867422 A | 8/2016 |

OTHER PUBLICATIONS

Sebastian Anthony, Apr. 19, 2012, SOC vs CPU—the battle for the future of computing. URL (https://web.archive.org/web/20120502025052/https://www.extremetech.com/computing/126235-soc-vs-cpu-the-battle-for-the-future-of-computing) (Year: 2012).*
https://web.archive.org/web/20150606223447/https://en.wikipedia.org/wiki/Display_Serial_Interface (Year: 2015).*
International Search Report for PCT/CN2016/102363, dated Jun. 19, 2017.

\* cited by examiner

GROUND STATION FOR AN UNMANNED AERIAL VEHICLE (UAV)

This is a US national phase entry patent application based on PCT patent application No. PCT/CN2016/102363 filed 18 Oct. 2016, which is incorporated herein for all purposes.

FIELD OF THE INVENTION

The invention relates to a ground station for wirelessly controlling operation of a small-sized UAV such as, but not limited to, a drone or a multi-copter.

BACKGROUND OF THE INVENTION

A multi-rotor or multi-copter, often referred to as a 'drone', is a rotorcraft normally with more than two rotors. An advantage of a multi-copter aircraft is the simpler rotor mechanics required for flight control. Unlike single- and double-rotor helicopters which use complex variable pitch rotors whose pitch varies as the blade rotates for flight stability and control, multi-copters typically use fixed-pitch blades. Consequently, control of vehicle motion is achieved by varying the relative speed of each rotor to change the thrust and torque produced by each rotor.

Conventionally available UAVs such as multi-copters or the like typically use a hand held device commonly referred to as a 'ground station' to remotely control the multi-copter via a wireless link or connection. Each of the ground station and the multi-copter are provisioned with suitable wireless transceivers for sending and receiving wireless signals including flight control signals, telemetry signals and the like. Many of such conventionally available multi-copters are controlled in flight through a first person view (FPV) image received from a camera on the multi-copter and viewed via a screen associated with the ground station. It is common for the screen used to not comprise an integral component of the ground station, but to comprise a generic electronic device such as a smart phone, phablet or tablet computer mounted on a bracket provided by the ground station. Communication between the ground station and generic electronic device mounted thereon is typically via a short range wireless connection such as a BlueTooth™ wireless connection, but more usually via a WiFi™ wireless connection, although a physical cable such as a Lightning™ connector as provided by Apple™ Inc. may be employed where the generic electronic device is an Apple™ Inc. product such as an Iphone™ or an Ipad™.

With a typical multi-copter ground station set-up, a live video image scene captured by the multi-copter camera is transmitted wirelessly from the multi-copter to the ground station. At the ground station, the received video image signal must be processed and retransmitted over the short range wireless connection or proprietary physical cable connection to the generic electronic device acting as the FPV screen for the ground station. This arrangement also requires that the generic electronic device has suitable software downloaded thereto, prior to use as a ground station screen, to enable it to function as an FPV screen.

A number or problems are encountered with the use of a generic electronic device as a FPV screen for a UAV ground station. One such problem encountered with the typical arrangement is a relatively high latency in video image signal processing which is undesirable. This occurs for a number of reasons, not least that the received digital video image signal processed at the ground station needs to be retransmitted wirelessly from the ground station to the generic electronic device or reformatted to be retransmitted over a proprietary physical cable connected between the ground station and generic electronic device. Furthermore, the generic electronic device is not optimized to function as a FPV screen for a UAV ground station which may also increase the level of latency between what a user sees in the FPV image and what the camera of the UAV is viewing. The greater the amount of latency, the less easy it is to control the UAV and the poorer the user experience of controlling flight of the UAV and gathering images.

Another problem encountered with the typical arrangement as afore-described is that it is not uncommon for the generic electronic device to become dislodged from the bracket of the ground station. Dislodgement of the generic electronic device from the bracket not only distracts the user from exercising flight control over the UAV, but the loss of the FPV image from view may compromise flight control. This can become a critical issue where the UAV is being controlled to fly near to obstacles such as buildings or past trees, etc.

A further problem with the typical arrangement is that, whilst many generic electronic devices are enabled to output high definition (HD) video images such as HDMI images, they are often not provisioned with any input to receive a digital HD video image. Consequently, the route by which a digital HD video image is conveyed from the UAV to the generic electronic device is one which is not optimized from a signal latency point of view.

Also in the typical arrangement, the generic electronic device is required to provide some other functions for the ground station such as provision of a map which requires the generic mobile device to execute a map application and exchange map signals and data with the ground station over the short range wireless connection or proprietary cable. This again involves undesirable latency in system signal transmission.

Consequently, in the typical sUAV ground station arrangement as afore-described, the data transfer paths, signal conversion processes, wireless communication pathways, application processing, and displaying processed image data on the screen of the generic electronic device associated with the ground station leads to high system latency which diminishes the quality of the user's experience in operating the UAV.

OBJECTS OF THE INVENTION

An object of the present invention is to provide an improved ground station for an unmanned aerial vehicle (UAV) such as a drone, multi-copter or other type of small-sized UAV including some fixed wing UAVs.

Another object of the present invention is to provide a ground station for a UAV such as a multi-copter for an improved user experience.

A further object of the present invention is to mitigate or obviate to some degree one or more problems associated with known ground stations for UAVs, or at least to provide a useful alternative.

The above objects are met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a ground station for a UAV, for example, a drone or a multi-copter, comprising: a housing for accommodating a system on chip (SOC) circuit including a control processor for executing software to wirelessly control functions of a UAV; a first screen; and a second screen; wherein one or both screens are controlled directly by the SOC control processor.

In a second main aspect, the invention provides a ground station for a UAV comprising: a clam shell housing comprising a first housing member for accommodating a control processor and a second housing member movable relative to the first housing member between a first closed position overlaying said first housing member and a second open position, the arrangement being such that the first housing member has mounted thereon a first screen and the second housing member has mounted thereon a second screen such that both screens are viewable by a user when the second housing member is in its open position, and wherein both screens are controlled directly by the control processor. In a third main aspect, the invention provides a ground station for a UAV comprising: a radio frequency module configured to wirelessly receive a high definition (HD) image signal from a camera of a UAV output in a digital format; an image signal processing module for converting said received digital format HD image signal to a MIPI signal; a processor for outputting said MIPI signal to one or both of a first ground station screen and a second ground station screen over a non-wireless connection.

In a fourth main aspect, the invention provides a UAV system comprising: a UAV; and a ground station according to any one of the preceding aspects of the invention.

In a fifth main aspect of the invention, there is provided a non-transitory computer readable medium storing program instructions which when executed by a processor cause a ground station for a UAV to operate in accordance with the present invention.

In a sixth main aspect of the invention, there is provided a system on chip (SOC) circuit including a control processor for executing software to wirelessly control functions of a UAV, for example, a multi-copter; system on chip (SOC) circuit having one or more outputs for outputting signals to a first screen and a second screen; wherein one or both screens are controlled directly by the SOC control processor.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Referring to the drawings, provided is an embodiment of a ground station 10 for a multi-copter. In the following description, embodiments of a multi-copter are described by way of example of an unmanned aerial vehicle (UAV), particularly a small-sized UAV having a weight up to about 40 kg, although this is not a limiting weight size. The ground station 10 comprises a housing 20. In preferred embodiments, the housing 20 may be in two parts and may comprise a clam shell housing having a first housing member 20A and a second housing member 20B. The second housing member 20B is preferably movable relative to the first housing member 20A between a first closed position overlaying said first housing member 20A and a second open position as seen in the drawings.

The second housing member 20B is preferably pivotally mounted on said first housing member 20A. The open position as shown in the drawings is the fully open position, but the second housing member 20B may be opened to any position between its closed and open positions as required by a user. A pivot connection 30 between the first and second housing members 20A, 20B may provide sufficient friction between the housing members to enable the second housing member 20B to hold its position when opened to any position between its closed and opened positions, although it will be understood that any suitable mechanism to effect opening of the second housing member 20B to any position between its closed and open positions may be utilised.

The ground station 10 preferably includes a first screen 40 mounted on the first housing member 20A and a second screen 50 mounted on the second housing member 20B. The arrangement is such that both screens 40, 50 are viewable by a user at least when the second housing member 20B is in its fully open position or near its fully open position.

In the preferred embodiment as shown in the drawings, it can be seen that the second screen 50 is preferably larger in size than the first screen 40. It is also preferred that the first screen 40 has a higher screen resolution than the second screen 50. It is also preferred that the second screen 50 is arranged in a landscape orientation relative to a normal viewing direction and that the first screen 40 is preferably arranged in a portrait orientation relative to a normal viewing direction.

Figure 4:
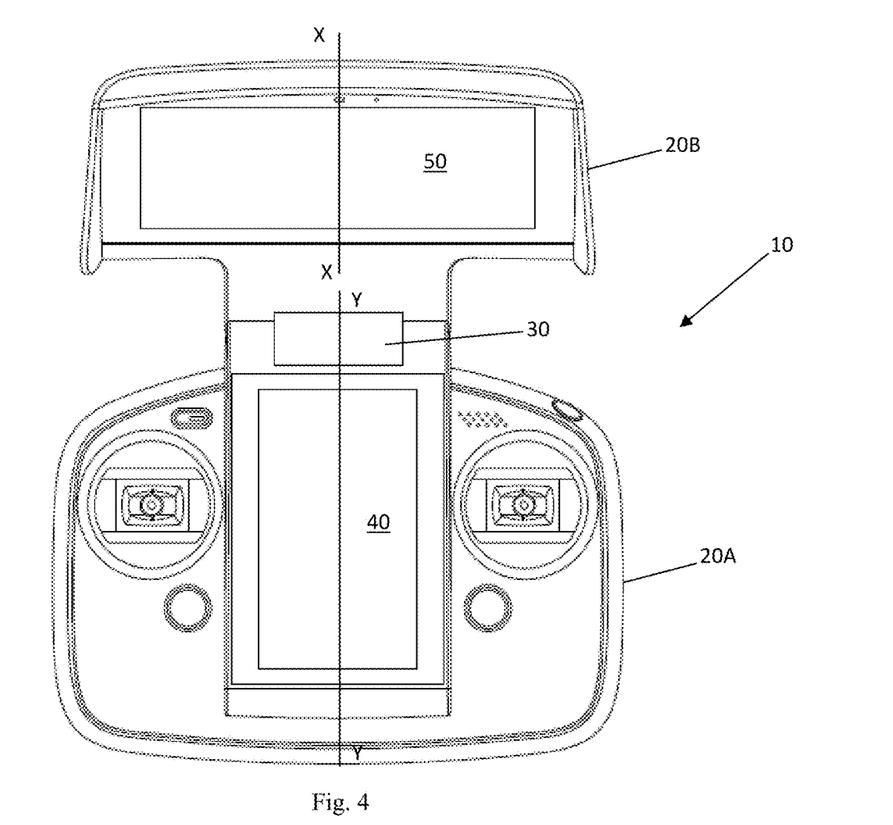
FIG. 4 is a top view of the ground station of FIG. 1.

As seen in FIG. 4, a central axis Y-Y of the first screen 40 is preferably aligned with a central axis X-X of the second screen 50 and the second screen 50 is preferably arranged above the first screen 40 as shown, when viewed from a normal viewing direction.

Figure 5:
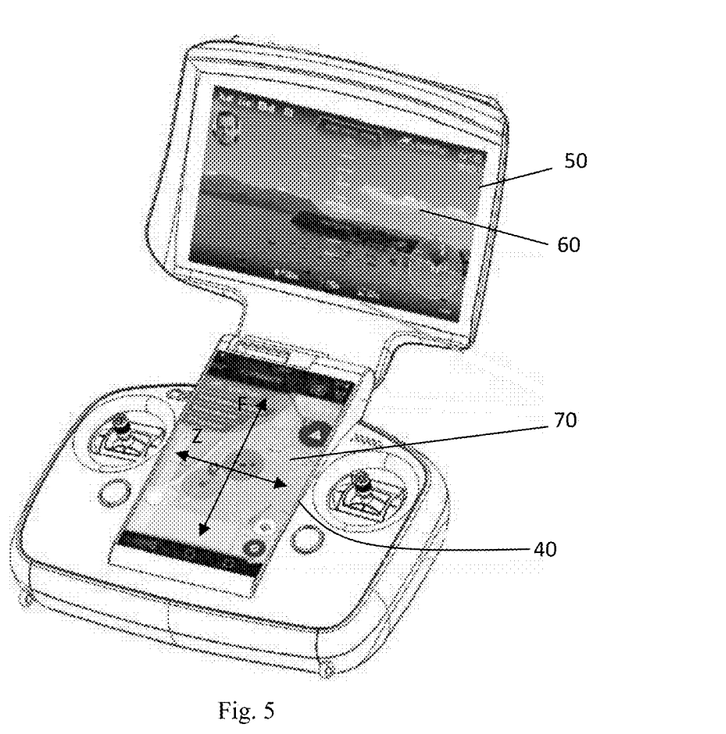
FIG. 5 is another perspective view of the ground station of FIG. 1 showing preferred uses of the first and second screens.

As better seen in FIG. 5, in use, it is preferred that the second screen 50 is controlled to display a video image received from a camera on the multi-copter and that preferably this comprises a FPV video image 60 to assist a user in controlling flight of the multi-copter. By placing the second screen 50 above the first screen 40 relative to a normal viewing direction has at least the advantage that this reduces the amount by which the user of the ground station 10 must tilt their head upwardly or downwardly when switching from directly viewing the multi-copter in flight to viewing the FPV image 60 on the second screen 50. Furthermore, by arranging the second screen 50 in a landscape orientation with respect to a normal viewing direction enhances the user's ability to exercise flight control using the wide aspect ratio FPV image 60. It will be understood, however, that the functions of the first and second screens 40, 50 may be reversible.

Also as better seen in FIG. 5, it is preferred to use the first screen 40 to display at least a map 70 of a region surrounding or at least forward of the ground station 10 identifying the location of the multi-copter in flight as well as geographical features in the map view 70. In some embodiments, the map view 70 provided on the first screen 40 enables the user to control flight of the multi-copter when it is out of sight or nearly out of sight, i.e. it is at a distance from the user where it is not easily visually distinguishable, e.g. more than about 200 m to 300 m or so away. The map view magnification may be varied by a user. The first screen 40 may be provisioned as a touch sensitive screen to receive user inputs to control magnification of the map view as well as other user inputs.

At least one advantage of arranging the first screen 40 in a portrait orientation is that it enhances the scope or scale of the map view 70 in a forward direction of the ground station 10. Typically, a user controlling flight of a multi-copter using a ground station tends to point the ground station in the general direction of the multi-copter in flight and to also face in such direction. The map view 70 shown on the first screen 40 is preferably not a fixed map view, but is arranged to adjust orientation in response to a detected orientation of the ground station 10. Consequently, there is an unexpected benefit in having the first screen 40 arranged in a portrait orientation in that, based on typical or expected user behaviour in operating the ground station 10, said screen 40 will show a greater extent of the map view 70 in a direction generally in line with a flight direction F of the multi-copter than in a direction Z orthogonal to said flight direction F. It will be understood that the reference to flight direction F is not a reference to an absolute geographical flight direction of the multi-copter, but is a reference to its flight direction relative to the ground station 10 at a point in time when a user holds the ground station 10 pointing generally in the direction of the multi-copter in flight.

In addition to a map view 70, the first screen 40 may be configured to display any of user control icons, multi-copter settings, and multi-copter sensor readings. These further display features may be displayed in an overlay on the map view 70 or in a separate section of the first screen 40.

The second screen 50 may also be provisioned as a touch sensitive screen configured to receive user touch inputs. The second screen 50 may be configured to display any of user control icons, multi-copter settings, multi-copter sensor readings, and a different magnification map view optionally higher than shown on the first screen 40. The second screen 50 may be configured to display any of soft buttons, indicators, graphics and text. The optionally alternative magnification map view may comprise a portion of the map view 70 shown on the first screen 40. These further display features may be displayed in an overlay on the FPV image view 60 or in a separate section of the second screen 50.

In one embodiment, a plane in which a viewing surface of the second screen 50 lies makes an angle in the range of 110 degrees to 170 degrees relative to a plane in which a viewing surface of the first screen 40 lies when the second housing member 20B is in its fully open position relative to the first housing member 20A. In another embodiment, the angle lies in the range of 125 degrees to 145 degrees or in the range of 130 degrees to 140 degrees. It is preferred, however, that the angle is about 135 degrees as this is considered to provide the best ergonomic experience for a user of the ground station 10 when switching between viewing the first or second screens 40, 50 or viewing the multi-copter in flight.

In a preferred embodiment, the first screen 40 is about 12.5 cms in size in its diagonal dimension. One further advantage of arranging the first screen 40 in a portrait orientation is that it allows the ground station width to be reduced while still providing a relatively large screen on the first housing member 20A and whilst still providing room for control joysticks 100A, 100B on either side of the first screen 40.

The control joysticks 100A, 100B are recessed in the first housing member 20A such that, when the second housing member 20B is in its closed position, the tops of the joysticks 100A, 100B do not impede closing of the ground station yet maintaining a relatively compact profile.

In a preferred embodiment, the second screen is about 17.5 cms in size in its diagonal dimension.

In a preferred embodiment, the second screen 50 has an aspect ratio the same or closely related to an aspect ratio of a first person view (FPV) image view 60 processed from the image signal wirelessly received from a camera on the multi-copter.

Figure 1:
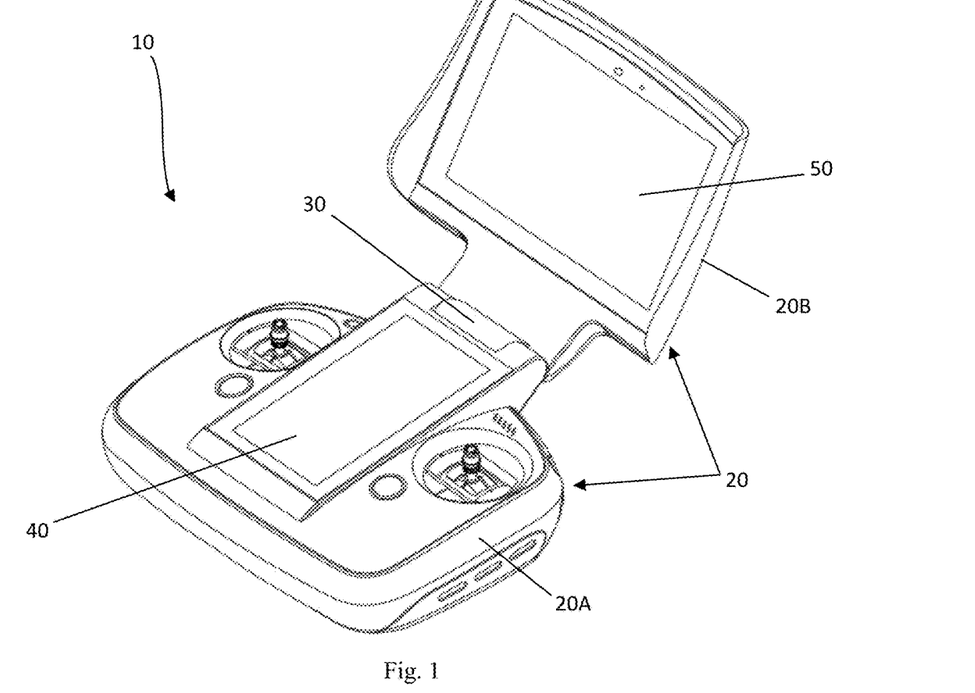
FIG. 1 perspective view of an embodiment of a ground station according to the invention with a second housing member showing in its open position relative to a first, main housing member.
Figure 2:
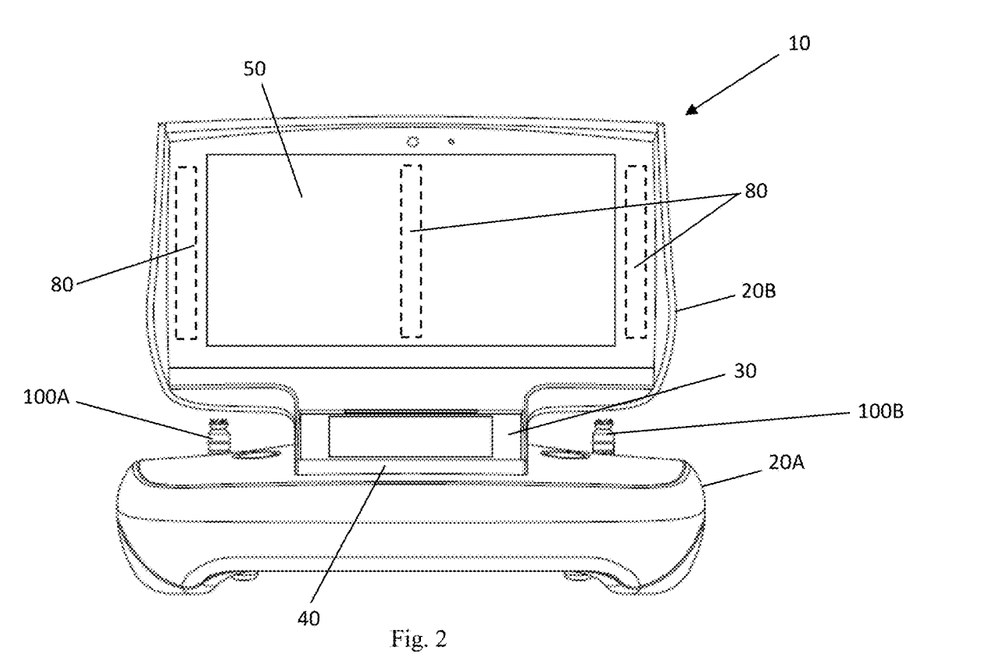
FIG. 2 is a front of the ground station of FIG. 1.
Figure 3:
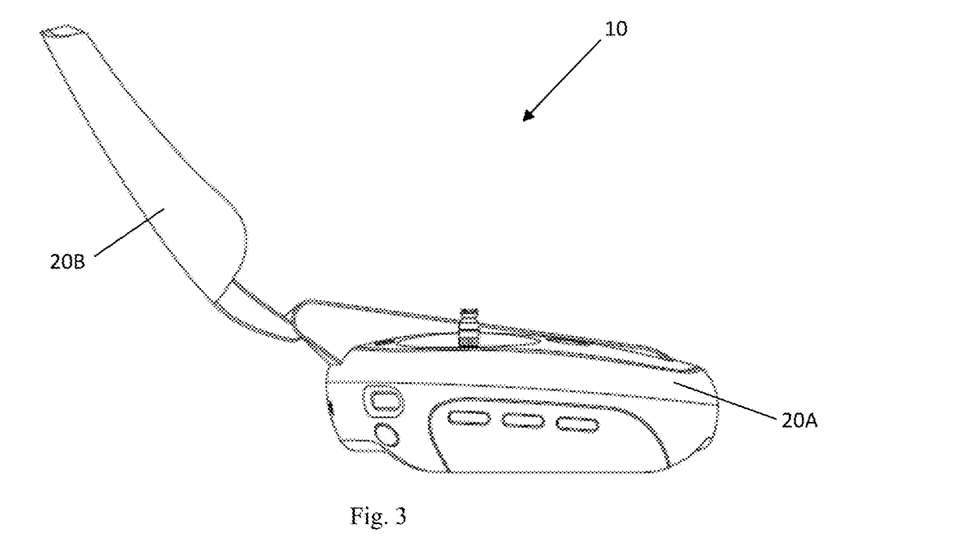
FIG. 3 is a side view of the ground station of FIG. 1.

The ground station 10 is provided with one or more antennas 80 installed in a suitable location or locations within the second housing member 20B for effecting wireless communication with the multi-copter. Preferably, as shown by dashed lines in FIG. 2, the one or more antennas 80 are mounted within the second housing member 20B such that they do not project from the housing member 20B or the ground station 10, i.e. the ground station 10 does not have external antennas. The one or more antennas 80 may be positioned adjacent and/or above the second screen 50 in a generally vertical orientation with respect to the screen. At least one advantage of positioning the one or more antennas 80 in the second housing member 20B is that this reduces the possibility of a user misaligning the one or more antennas 80, e.g. holding the ground station 10 in an orientation in use such that the one or more antennas 80 are horizontal with the ground.

Figure 6:
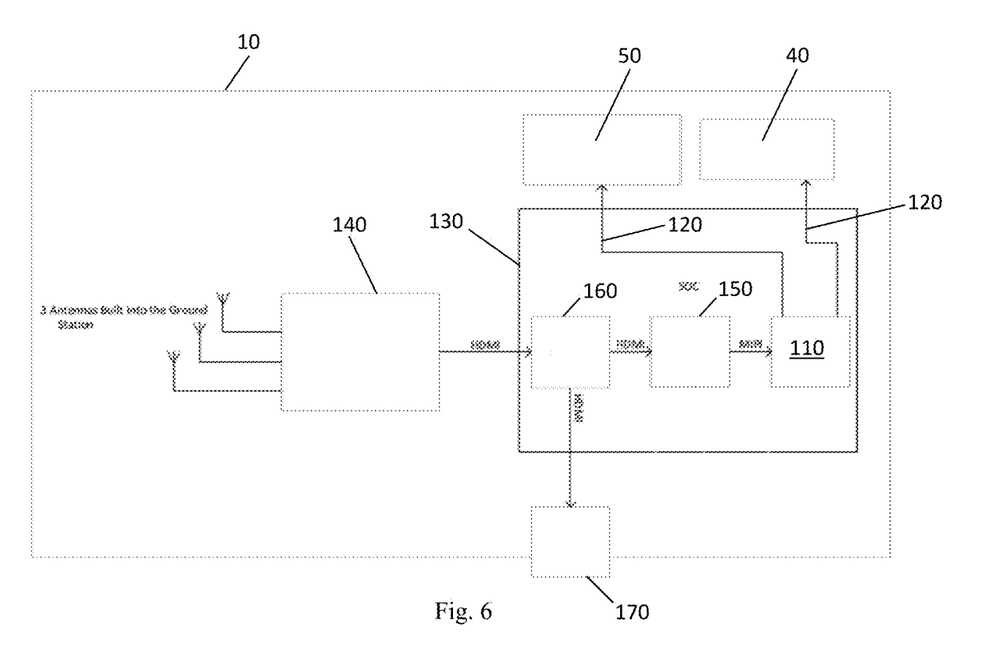
FIG. 6 is a section of a block diagram of a system on chip (SOC) circuit for the ground station of FIG. 1 showing the path of the FPV video signal through the system.

The first housing member 20A is preferably arranged to house a control processor 110 which is configured to directly control both the first and second screens 40, 50 through a non-wireless connection as shown in FIG. 6. The non-wireless connection preferably comprises one or more hard wired connections 120. The control processor 110 is preferably provided on a system on chip (SOC) circuit 130 which may comprise a SOC integrated circuit and may include or have associated therewith other processors and input and output ports. The first and second screens 40, 50 are each connected to said control processor 110 on said SOC circuit 130 by one or more hard wired connections 120.

A system on a chip or system on chip (SOC) is typically an integrated circuit (IC) that integrates all components of a computer or other electronic system into a single chip substrate. It may contain digital, analog, mixed-signal, and radio-frequency functions all on the single chip substrate. It may also include further processors and input/output ports on the integrated circuit or on a PCB of the integrated circuit.

The ground station 10 is configured to wirelessly receive a digital image signal from the camera on the multi-copter and the SOC circuit 130 is configured to process said received image signal to thereby display on said second screen 50 at least the FPV view 60. The ground station 10 is configured to receive a high definition (HD) digital video image from the camera and to convert said HD video image in the SOC circuit 130 to a mobile industry processor interface (MIPI) format for outputting to one or both of the first and second screens 40, 50.

Preferably, the SOC circuit 130 is configured to execute an operating system (OS) software to implement control and other functions for the ground station 10 and/or the multi-copter, where the preferred OS comprises the Android™ OS. Preferably, also, the Android™ OS software executing on the SOC circuit 130 is configured to implement generic mobile device software applications in addition to ground station and multi-copter control instructions.

More specifically, as shown by FIG. 6, the ground station 10 comprises a radio frequency receiver or transceiver 140 configured to wirelessly receive a high definition (HD) image signal from the multi-copter camera and an image signal processing module 150 for converting said received HD image signal to a MIPI signal. The control processor 110 is configured to output said MIPI signal to one or both of the first screen 40 and the second screen 50 on said hard wired connection 120. Preferably, the image signal processing module 150 and the processor 110 are both provisioned on the SOC 130, but may co-exist on the SOC circuit board/PCB.

The ground station 10 may be provided with a splitter module 160 for splitting said received HD image signal into a first HD image signal output from the splitter module 160 to the image signal processing module 150 and a second HD image signal output from the splitter module 160 to a HD user output connector 170. The splitter module 160 is preferably provisioned on the SOC 130, but may co-exist on the SOC circuit board/PCB. The radio frequency receiver or transceiver 140 may comprise a first person view (FPV) image module. The receiver part of the digital video downlink module (image module) provides a low latency video streaming function. The HD image signal is preferably a High Definition Media Interface (HDMI) signal.

In general, the invention relates to a ground station for a multi-copter comprising a housing for accommodating a system on chip (SOC) integrated circuit including a control processor and associated PCB with additional processors and input/output ports for executing software to wirelessly control functions of the multi-copter, a first screen, and a second screen, wherein one or both screens are controlled directly by the SOC control processor and associated circuit. The housing may comprise a clam shell housing comprising a first housing member for accommodating the control processor and a second housing member movable relative to the first housing member between a first closed position overlaying said first housing member and a second open position. The arrangement is such that the first housing member has mounted thereon the first screen and the second housing member has mounted thereon the second screen such that both screens are viewable by a user when the second housing member is in its open position.

The ground station in accordance with the invention provides a ground station with a SOC circuit and associated PCB with additional processors and input/output ports having an embedded HD video processing capability. The image view displayed on the second screen is fully customizable because the received UAV image signal is processed in the SOC circuit containing the SOC integrated circuit before being outputted on the second screen.

Furthermore, the ground station can be used as a stand-alone device for outputting HD video images to external devices using its HD output connector. This enables the ground station to be used to stream video images from the UAV in real-time to external devices and to transmit such video images in real-time over a network such as the internet. The ground station can also be used as an audio editor and other functions where the provision of two screens is yet a further advantage.

The ground station in accordance with the invention provides one screen or display dedicated to showing the multi-copter (drone) camera view whilst keeping most, if not all, flight information on another screen or display. Where only one screen is provided, as in many conventional ground stations, the user may be required to switch between an FPV image view and a map view for example, or to tolerate a very cluttered FPV view.

The ground station in accordance with the invention overcomes or reduces the latency delays typically encountered in conventional multi-copter systems by using low latency modules and circuits and by also minimising the number of times that the multi-copter camera image signal needs to be processed, transmitted or converted between signal formats.

The ground station in accordance with the invention enables easy user manipulation or adjustment of the second screen tilt for more comfortable viewing particularly in high ambient light conditions. The ground station also employs high light output screens to increase readability under bright light conditions. The ground station may include an inbuilt light sensor to automatically adjust the screen backlights according to sensed conditions and/or user preferences.

The ground station in accordance with the invention may be provisioned with a forward facing camera, preferably on the second housing member 20B, to capture images of the user.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such prior art does not constitute an admission that the prior art forms a part of the common general knowledge in the art.

The invention claimed is:

1. A ground station for an unmanned aerial vehicle (UAV) comprising:
   a housing for accommodating a system on chip (SOC) circuit including a control processor for executing software to wirelessly control functions of a UAV;
   a first screen and a second screen, wherein both screens are controlled directly by the SOC control processor;
   wherein the second screen is arranged in a landscape orientation relative to a normal viewing direction and the first screen is arranged in a portrait orientation relative to a normal viewing direction, with the second screen is arranged above the first screen;
   a radio frequency receiver configured to wirelessly receive a high definition (HD) image signal from a camera of a UAV;
   an image signal processing module for converting said received HD image signal to a mobile industry processor interface (MIPI) signal; and
   a processor for outputting said MIPI signal to one or both of the first screen and the second screen over a non-wireless, hardware connection to thereby display at least a first person view (FPV) image obtained from the received image signal;
   wherein the image signal processing module and the processor are both provided on the system on chip (SOC) circuit.

2. The ground station according to claim 1, wherein both screens are controlled directly by the SOC control processor through a non-wireless, hard wired connection between the SOC control processor and each of said first and second screens.

3. The ground station according to claim 1, wherein the second screen is larger in size than the first screen.

4. The ground station according to claim 1, wherein the converted MIPI signal is output to the second screen to thereby display on said second screen at least a first person view (FPV) image obtained from the received image signal.

5. The ground station according to claim 1, wherein the second screen has an aspect ratio the same or closely related to an aspect ratio of the first person view (FPV) image processed from the image signal wirelessly received from the camera on the UAV.

6. The ground station according to claim 1, wherein the second screen is arranged above the first screen with a central axis of the first screen being aligned with a central axis of the second screen and/or.

7. The ground station according to claim 1, wherein the first screen is configured to display any one or any combination of a map, user control icons, multi-copter settings, and multi-copter sensor readings; wherein the map displayed on the first screen comprises a map of a region of predetermined and variable size presented forward of the ground station.

8. The ground station according to claim 1, wherein the SOC circuit is configured to execute an operating system (OS) software to implement control and/or other functions for the ground station and/or the UAV and the OS software is adapted to implement mobile device software applications and/or UAV control software.

9. The ground station according to claim 1, wherein the housing comprises a clam shell housing having a first housing member for accommodating the SOC control processor and a second housing member movable relative to the first housing member between a first closed position overlaying said first housing member and a second open position, the arrangement being such that the first housing member has mounted thereon the first screen and the second housing member has mounted thereon the second screen such that both screens are viewable by a user when the second housing member is at or near its open position.

10. The ground station according to claim 9, wherein one of more ground station radio antennas are mounted internally in the second housing member.

11. The ground station according to claim 1, wherein there is provided a splitter module for splitting said received HD image signal into a first HD image signal output from the splitter module to the image signal processing module and a second HD image signal output from the splitter module to a HD user output connector.

12. The ground station according to claim 11, wherein the splitter module is also provided on the SOC circuit.

13. The ground station according to claim 1, wherein the HD image signal being a High Definition Media Interface (HDMI) signal received wirelessly from the camera of the multi-copter is first received by a first person view (FPV) image module of the radio frequency receiver of the ground station.

14. A ground station for a UAV comprising:
   a clam shell housing comprising a first housing member for accommodating a system of chip (SOC) circuit including a control processor and a second housing member movable relative to the first housing member between a first closed position overlaying said first housing member and a second open position, the arrangement being such that the first housing member has mounted thereon a first screen and the second housing member has mounted thereon a second screen such that both screens are viewable by a user when the second housing member is in its open position, and wherein both screens are controlled directly by the SOC control processor, wherein the second screen is arranged in a landscape orientation relative to a normal viewing direction and the first screen is arranged in a portrait orientation relative to a normal viewing direction, with the second screen is arranged above the first screen;

a radio frequency receiver configured to wirelessly receive a high definition (HD) image signal from a camera of a UAV;

an image signal processing module for converting said received HD image signal to a mobile industry processor interface (MIPI) signal; and a processor for outputting said MIPI signal to one or both of the first screen and the second screen over a non-wireless, hardware connection to thereby display at least a first person view (FPV) image obtained from the received image signal;

wherein the image signal processing module and the processor are both provided on the system on chip (SOC) circuit.

* * * * *